Oct. 30, 1962 — L. S. GOULDEN — 3,061,332
CARGO TRANSPORT ASSEMBLY
Filed June 17, 1960 — 5 Sheets-Sheet 1

INVENTOR.
LEO S. GOULDEN
BY
McMorrow, Berman & Davidson
ATTORNEYS

Oct. 30, 1962 L. S. GOULDEN 3,061,332
CARGO TRANSPORT ASSEMBLY
Filed June 17, 1960 5 Sheets-Sheet 2

INVENTOR.
LEO S. GOULDEN
BY
McMorrow, Berman & Davidson
ATTORNEYS

Oct. 30, 1962   L. S. GOULDEN   3,061,332
CARGO TRANSPORT ASSEMBLY
Filed June 17, 1960   5 Sheets-Sheet 3

INVENTOR.
LEO S. GOULDEN
BY
*McMorrow, Berman & Davidson*
ATTORNEYS

Oct. 30, 1962    L. S. GOULDEN    3,061,332
CARGO TRANSPORT ASSEMBLY
Filed June 17, 1960    5 Sheets-Sheet 5

INVENTOR.
LEO S. GOULDEN
BY
McMorrow, Berman & Davidson
ATTORNEYS

United States Patent Office 3,061,332
Patented Oct. 30, 1962

3,061,332
CARGO TRANSPORT ASSEMBLY
Leo S. Goulden, 1005 67th St., Des Moines, Iowa
Filed June 17, 1960, Ser. No. 36,875
22 Claims. (Cl. 280—415)

The present invention relates to cargo carrying transport assemblies generally and in particular to a cargo transport unit having separable and tandem bodies.

In the trucking industry, the time a trailer body is off the road is an expense of considerable importance in computing the earnings of the trailer body. Any device or method which permits rapid loading and unloading of a trailer body at the end of its run may be counted upon to increase the efficiency and earnings of such a trailer body.

An object of the present invention is to provide a cargo transport assembly which lends itself to loading and unloading in half the usual time when compared to a cargo transport assembly of equal size and presently in use.

Another object of the present invention is to provide a cargo transport assembly which permits loading and unloading of both bodies of the assembly simultaneously and, if desired, at separate loading docks or areas.

A further object of the present invention is to provide a cargo transport assembly which employs a leading cargo body and a trailing cargo body which may be manufactured in quantity so as to have interchangeable units.

A still further object of the present invention is to provide a cargo transport assembly having a leading body and a trailing body each of which may be made in a standard size and adapted to be towed over the highway by the conventional fifth wheel tractor.

Yet another object of the present invention is to provide a cargo transport assembly which is sturdy in construction, simple in structure, and one which is economically feasible.

These and other objects and advantages of the present invention will be fully apparent from the following description when taken in conjunction with the annexed drawings, in which.

Figure 2:
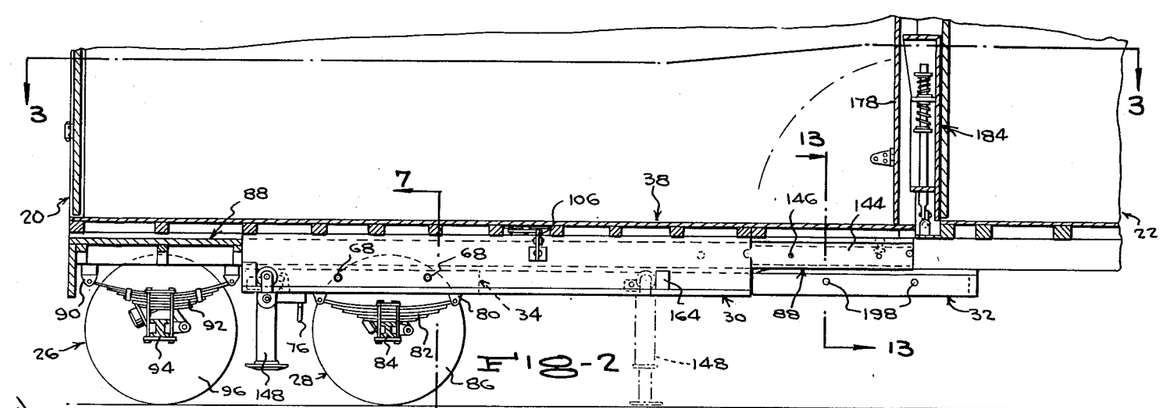
FIGURE 2 is a view taken on the line 2—2 of FIGURE 1.
Figure 3:
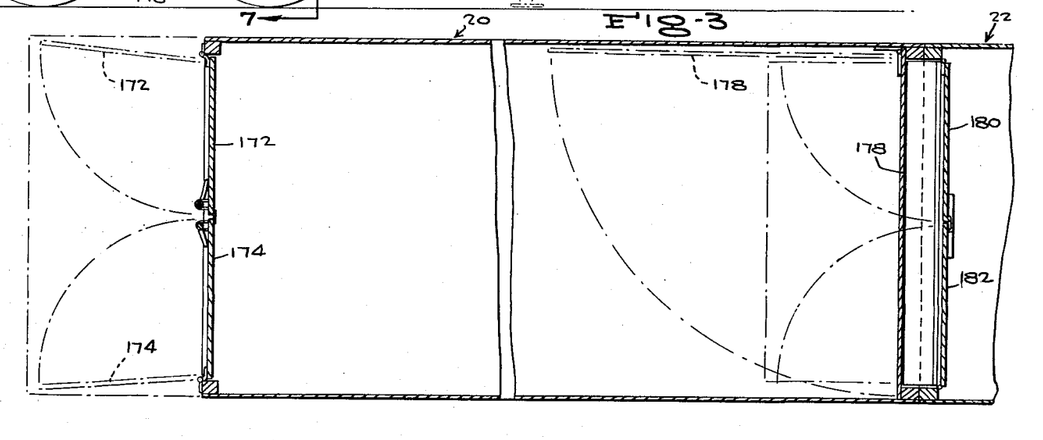
FIGURE 3 is a view taken on the line 3—3 of FIGURE 2.

Referring in greater detail to the drawings, in which like numerals indicate like parts throughout the several views, and with particular reference to FIGURES 2 and 3, the reference numerals 20 and 22 designate, respectively, a trailing cargo carrying body and a leading cargo carrying body arranged in tandem relation and constituting the cargo transport assembly of the present invention.

Means is provided on the leading body 22 for attachment to a towing vehicle. This means consists in a conventional fifth wheel connecting pin 24, as shown most clearly in FIGURE 1B and FIGURE 5.

A first wheel axle assembly 26 is positioned transversely of and beneath the trailing body 20 and adjacent the rearward end of the trailing body 20 for supporting the rearward end portion of the trailing body 20.

A second wheel axle assembly 28 is positioned transversely of the trailing body 20 and forwardly of and adjacent the first axle assembly 26.

Means is provided connecting the second axle assembly 28 to the trailing body 20 and to the leading body 22 for movement from the position adjacent the first axle assembly 26 to a position adjacent to and supporting the rearward end portion of the leading body 22. Specifically, this means consists in support means in the form of a trackway 30 depending from the underface of the trailing body 20 and extending from the first axle assembly 26 to a point inwardly of and spaced from the forward end of the trailing body 20 and another trackway 32 extending from the forward end of the trackway 30 to a point beneath and adjacent the rearward end of the leading body 22. This trackway 32 is dependingly carried by the leading body 22.

Figure 1:
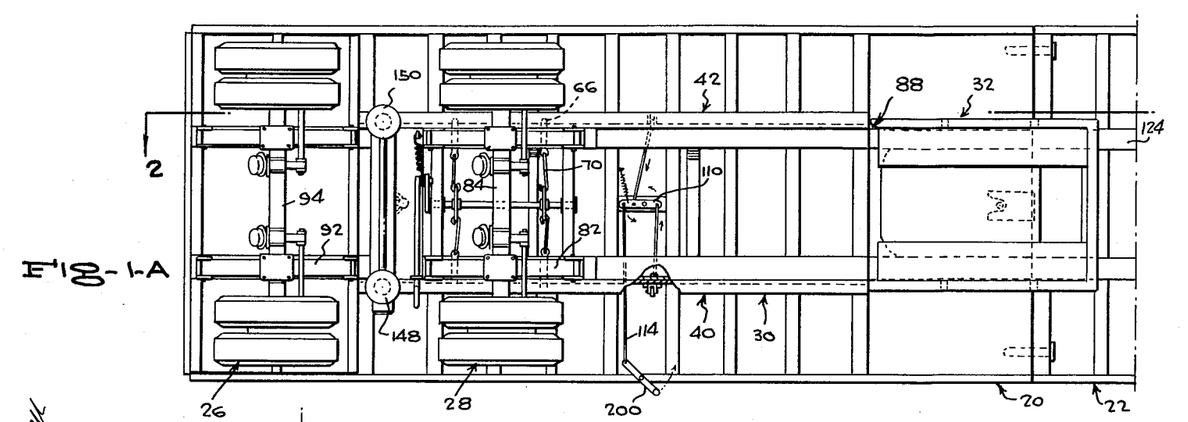
FIGURE 1A is a bottom plan view of the trailing body and a portion of the leading body of the cargo transport assembly of the present invention.
FIGURE 1B is a bottom plan view of the remaining portion of the leading body.
Figure 4:
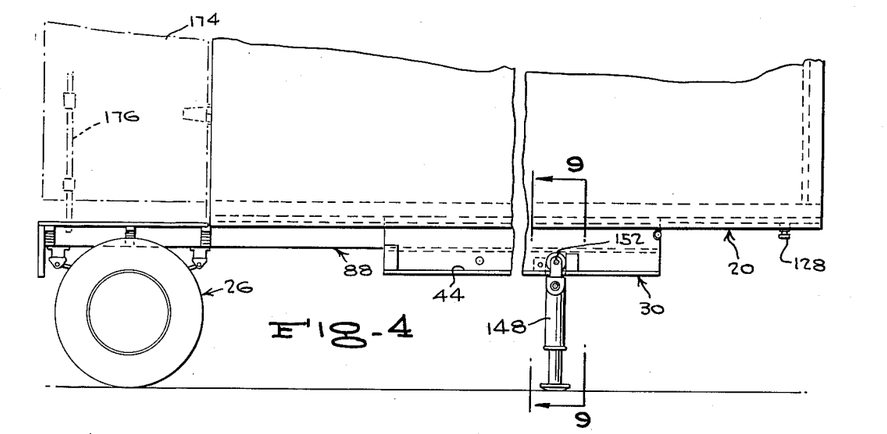
FIGURE 4 is a side elevational view of the trailing body after detachment of one wheel axle assembly and detachment of the leading body.

This means also includes hanger means in the form of a carriage 34 slidable in the trackways 30 and 32 and carried by the second axle assembly 28. In FIGURES 1A and 2 the axle assemblies 26 and 28 are shown in one position under the trailing body 20, in FIGURE 4 the axle assembly 26 is shown in its position below the trailing body 20, and in FIGURE 5 the axle assembly 28 is shown removed from under the trailing body 20 and in position under the leading body 22.

A latching member is provided on the carriage 34 and is releasably engageable with means provided on the trackways 30 and 32 for fixedly holding the axle assembly 28 in either of the aforesaid positions. This latching member is designated generally by the reference numeral 36 and will be described in detail later.

Figure 7:
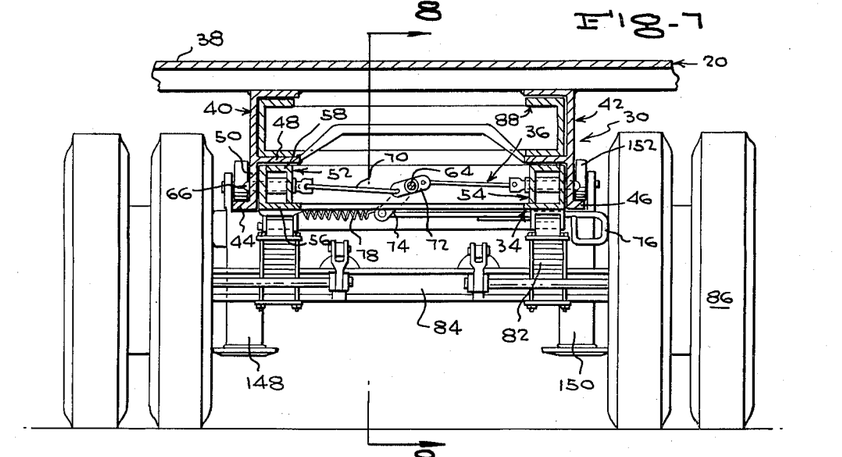
FIGURE 7 is a view on an enlarged scale, taken on the line 7—7 of FIGURE 2.

With reference to FIGURES 2 and 7, the trailing body 20 includes a trailer bed 38 supported upon a pair of laterally spaced longitudinally extending beams 40 and 42. The beams 40 and 42 are generally F-shaped and are each provided with a shelf 44 and 46, respectively. The shelves 44 and 46 project outwardly from the lower end of the beams 40 and 42, as shown clearly in FIGURE 7.

As the beams 40 and 42 are identical, they will be described with reference to the beam 40. The projection 48 rests upon the carriage 34 and the vertically disposed lower end portion 50 of the beam 40 abuts against one ouside face of the carriage 34. The carriage 34 is comprised of two side pieces 52 and 54, each fabricated from a pair of angle iron members 56 and 58 arranged in face to face longitudinally abutting relation, as shown most clearly in FIGURE 7 with reference to the side piece 52.

The projection 48 and lower end portion 50 of the beam 40 forms a support means depending from the bed 38 of the trailing body 20. They also form the trackway, elongated in form, and designated generally by the numeral 30.

Figure 8:
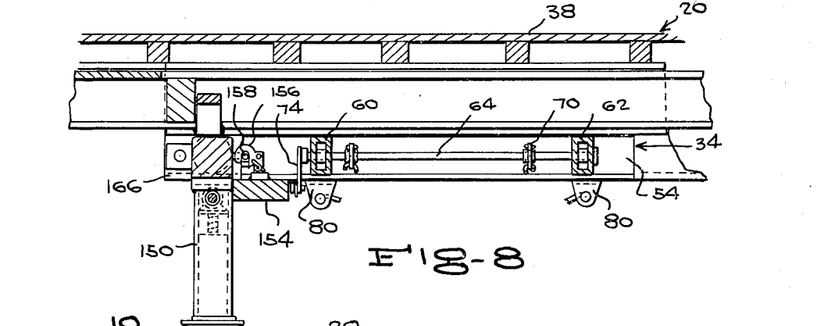
FIGURE 8 is a view taken on the line 8—8 of FIGURE 7.

The side piece 54 is also fabricated of a pair of angle iron members and two box members 60 and 62 extend between the side pieces 52 and 54 and connect the latter together as well as form trunnions for a shaft 64 extending longitudinally of the trackway 30 and forming a part of the latching member 36, as shown most clearly in FIGURES 7 and 8.

The latching means or member 36 includes a pair of pins 66 slidably mounted in each of the side pieces 52 and 54 and having their free ends projecting through holes 68 provided in the portion 50 of the respective beam 40 or 42. The inner end of each pin 66 is connected by a link 70 to the adjacent end of an arm element 72 fixed on the shaft 64. A crank arm 74 on one end of the shaft 64 has its free end connected to one end of an operating handle 76. The handle 76 projects exteriorly of the carriage 34 immediately to the rear of the tires of the second axle assembly 28, as shown most clearly in FIGURES 2 and 7.

A spring 78 has one end connected to the free end of the crank arm 74 and the other end connected to the adjacent portion of the carriage 34 and biases the crank arm 74 to the position in which each pin 66 is received in the adjacent hole 68.

Depending from the side pieces 52 and 54 of the carriage 34 are conventional spring shackles 80 dependingly supporting springs 82, an axle 84, and the wheels 86 of the wheel axle assembly 28.

Means is provided connecting the first axle assembly 26 to the trailing body 20 for movement from the position in which the first axle assembly 26 is beneath and adjacent the rearward end of the trailing body 20 to a position rearwardly of and adjacent the rearward end of the trailing body 20. Specifically this means consists in another trackway formed by the upper end portions of the beams 40 and 42 and constituting a support means for a second hanger means or carriage 88 fixedly carried by the first wheel axle assembly 26.

Other spring shackles 90 depend from the carriage 88 and carry springs 92 which support the axle 94 and wheels 96 of the axle assembly 26.

Figures 10, 11, 12:
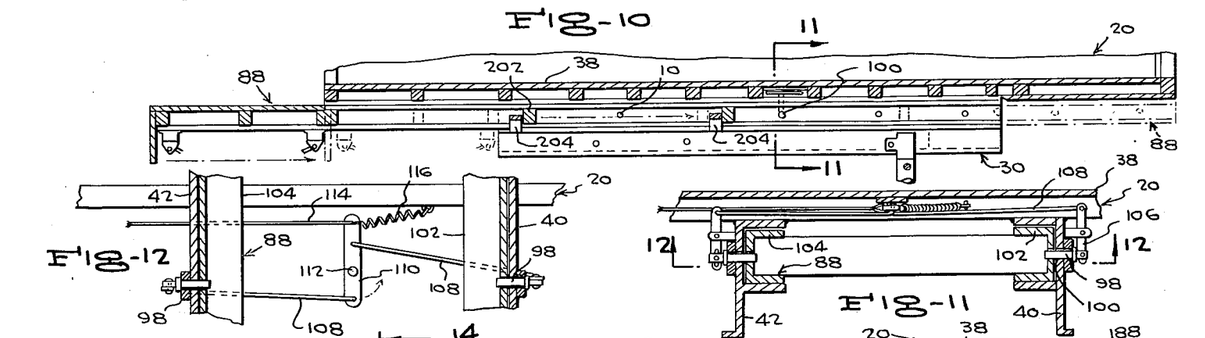
FIGURE 10 is a view taken on the line 10—10 of FIGURE 9.
FIGURE 11 is a view on an enlarged scale, taken on the line 11—11 of FIGURE 10.
FIGURE 12 is a view taken on the line 12—12 of FIGURE 11.

In FIGURE 10, the carriage 88 is shown in the position in which the axle assembly 26 is rearwardly of the rearward end of the trailing body 20. Latch means is provided for releasably securing the carriage 88 in such position. This latch means is shown in FIGURES 11 and 12 and it consists in a pin 98 received in a hole 100 in the adjacent portion of each of the beams 40 and 42 and selectively received in any one of the plurality of holes provided in the channel shaped side pieces 102 and 104 of the carriage 88.

Each pin 98 has its other end connected to one end of a lever 106 which is mounted for rocking movement about an intermediate part on the outer face of the adjacent beam 40 and 42. The other end of each lever 106 is connected by a rod 108 to one end of an operating arm 110 (FIGURE 12) pivotally connected intermediate its ends by a pin 112 which projects from the trailer bed 38 intermediate the ends of the latter.

An actuator 114 has one end connected to the arm 110 and has the other end exteriorly of the beam 42 for grasping by the hands of a user for exerting a rotary force to the arm 110 which results in unlocking the pins 98 from their respective holes. A spring 116 biases the arm 110 to the position in which the pins 98 are held within their respective holes.

Figures 13, 14, 15:
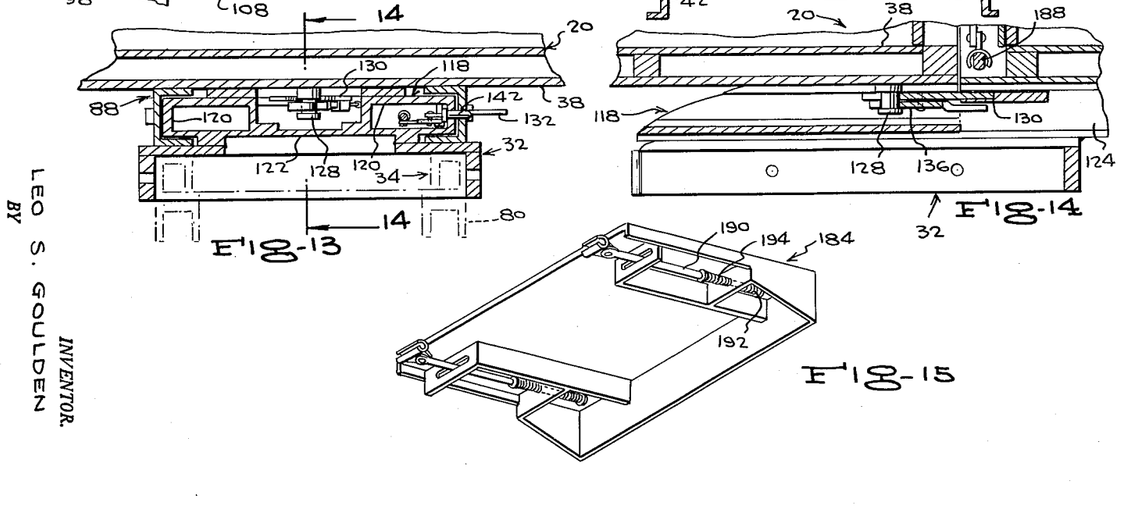
FIGURE 13 is a view taken on the line 13—13 of FIGURE 2, and on an enlarged scale.
FIGURE 14 is a view taken on the line 14—14 of FIGURE 13.
FIGURE 15 is an isometric view of the tail gate of the leading body.

Releasable attaching means is provided for securing the trailing body 20 and the leading body 22 together in tandem relation and holding such bodies against lateral movement relative to each other. Specifically, this means is shown in FIGURES 6, 13 and 14, and consists in the adjacent end of the carriage 88 which forms a box structure dependingly carried by the trailing body 20 adjacent the forward end of the latter when the carriage 88 is in the position in which the first axle assembly 26 is inwardly of and beneath the rearward end of that body 20, as shown in FIGURE 2. This portion of the carriage 88 receives a tongue structure dependingly carried by the rearward end portion of the body 22, such tongue structure being shown in FIGURE 6 and designated generally by the reference numeral 118. The tongue structure 118 consists of two laterally spaced box-like elements 120 connected together at their bottoms by a plate member 122. This structure is seen best in FIGURES 5, 13, and 14. The tongue structure 118 is fixedly secured to the upper face of the trackway 32 and forms a support for the trackway 32. The portion of the tongue structure 118 adjacent the forward end extends into the adjacent one end of a pair of channel members 124 which are arranged in face to face spaced relation and are fixedly secured to the underface of the leading body 22 adjacent the rearward end of the latter. The tongue structure 118 is fixedly secured by welding to the channel members 124.

The portion of the tongue structure 118 adjacent the rearward end is formed to a pair of noses, one on each of the elements 120, as at 126 in FIGURE 6, so as to permit rapid entry and alignment of the elements 120 into the forward end of the box structure formed by the projecting end of the carriage 88 when the latter is in the forward position.

The close sliding fit of the tongue structure 118 into the adjacent end of the carriage 88 prevents lateral displacement of the trailing body 20 from the leading body 22. The means for securing the two bodies together consists in a pin 128 depending from the underface of the bed 38 of the body 20 (FIGURE 13) and a hook mechanism 130 pivotally mounted in the tongue structure 118 between the elements 120. The combination of the hook mechanism 130 with the pin 128 is copied from the conventional hitch means employed with tractors and trailers. It is operated from exteriorly of the body 22 by means of an actuating lever 132 pivotally mounted in the adjacent channel member 124 and connected by a link 134 to the moving jaw 136 of the mechanism 130.

The actuating lever 132 is also connected at one end of a link 138 and connected by means of crank levers 140 to a pair of locking pins 142 extending outwardly of the adjacent side of the tongue structure 118 and engageable in holes provided in the sides of the adjacent channel member 144 of the carriage 88, the pins 142 being shown in FIGURE 6 and the holes in the channel member 144 being shown best in FIGURE 2 and designated by the reference numeral 146.

Figure 9:
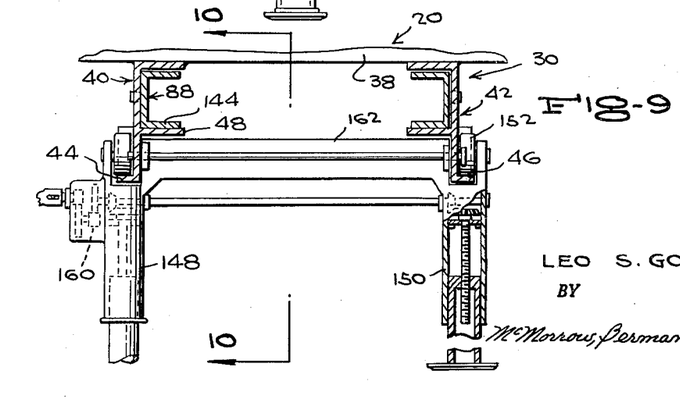
FIGURE 9 is a view on an enlarged scale, taken on the line 9—9 of FIGURE 4.

With reference to FIGURES 2, 8, and 9, the present invention provides a pair of supports 148 and 150, of the stiff-leg type, dependingly carried on the shelves 44 and 46, respectively. The upper end of each of the supports 148 and 150 is provided with a roller 152 rollably engaging the adjacent shelf 44 or 46.

Extending transversely of the carriage 34 and having its ends fixedly secured to the side pieces 52 and 54 is a cross beam 154 (FIGURE 8) supporting a spring-biased latch structure 156. The latch structure 156 releasably engages a ring or eye element 158 secured to the adjacent support 148. An identical latch structure 156 engages another eye element 158 attached to the support 150.

The support 148 contains the gear mechanism, shown in dotted lines at 160 for raising and lowering the feet of the supports 148 and 150 simultaneously. This structure is conventional and need not be further described. The supports 148 and 150 are connected together by a cross member 162 so that they move together as a unit.

With reference to FIGURE 2, the trackway 30 carries a stop 164 engageable by each of the rollers 152 when the supports 148 and 150 are moved forwardly in the trackway 30. Normally, the supports 148 and 150 are at the rearward end of the trackway 30 where they engage another stop 166.

Figure 5:
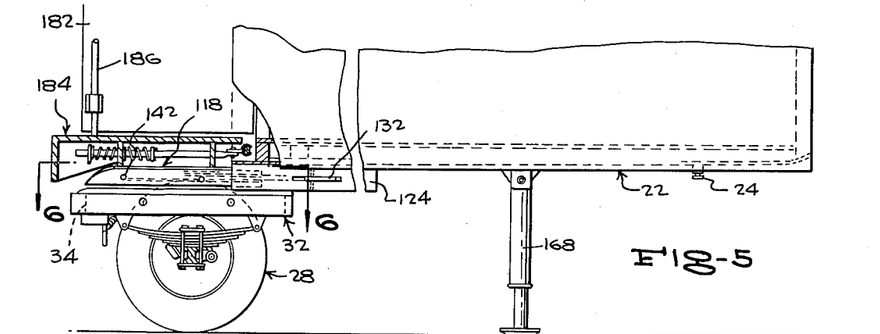
FIGURE 5 is a side elevational view of the detached leading body on the detached one wheel axle assembly, a portion being shown in section.
Figure 6:
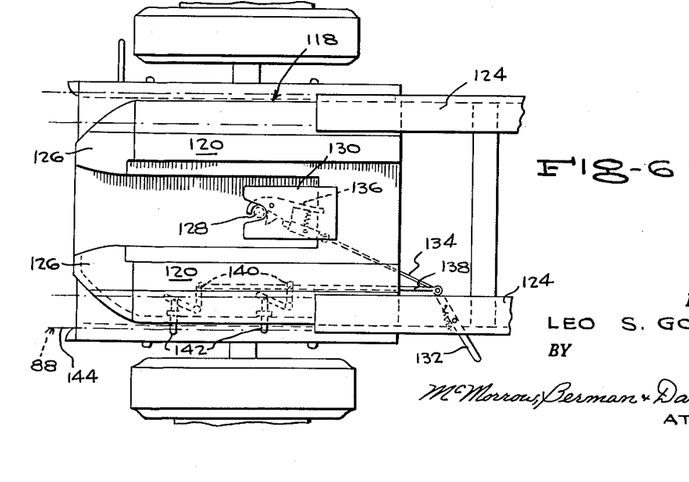
FIGURE 6 is a view on an enlarged scale, taken on the line 6—6 of FIGURE 5.

The present invention also provides another pair of supports, also of the fixed-leg type, at 168 and 170 in FIGURES 1B and 5. These supports 168 and 170 are not movable in their depending connection to the underface of the leading body 22 and are of the conventional type which are raised and lowered by either mechanical or manual means of which no further description is deemed necessary.

The present invention also provides on the rearward end of the trailing body 20 a pair of swingable doors 172 and 174 hingedly connected to the body 20. Vertical movable lock bars 176 of conventional design are employed to secure the doors 172 and 174 in the open position when the first wheel axle assembly 26 has been shifted to the position rearwardly of the trailing body 20, as shown in dotted lines in FIGURES 3 and 4.

The forward end of the body 20 is provided with a swingable door 178 hingedly connected to one side of the body 20 and movable from a position closing the forward end of the body 20 to a position parallel to one of the walls of the body 20, as shown in FIGURE 3.

The rearward end of the body 22 (FIGURE 3) is provided with a pair of doors 180 and 182 swingable rearwardly to a position within the body 20, as shown in dotted lines, from the normally aligned position closing the rearward end of the body 22.

Provided also at the rearward end of the body 22 is a removable platform 184 swingable from a vertical position shown in FIGURE 2 to a horizontal position shown in FIGURE 5 when the carriage 34 has been moved forwardly to the support position beneath the rearward end of the body 22.

When the platform 184 is in the horizontal position, the doors 180 and 182 may be swung outwardly and releasably secured in the outward position by means of another bar 186, as in FIGURE 5.

The platform 184 is attached to the body 22 by a transversely extending bar 188 having opposed flat sides, as shown most clearly in FIGURE 14. The platform 184 has a pair of longitudinally extending bars 190 provided with buffer springs 192 and 194 resiliently separating the platform 184 from the bars 190. One end of each of the bars 190 carries a split sleeve 196 which embracingly engages the bar 188 when the platform is horizontal but permits lifting of the platform from the bar 188 when the platform is vertical.

In operation, the bodies 20 and 22 when in the tandem attached condition may be towed by a conventional highway tractor or other towing vehicle with the axle assemblies 26 and 28 in the position shown in FIGURES 1A and 2 underneath and in supporting relation with respect to the rearward portion of the body 20.

When it is desired to load or unload the bodies 20 and 22, they may be separated by the following procedure. First, the brakes of the second wheel axle assembly 28 are set by suitable means such as hand actuable valves in the air lines which control the brakes of the assemblies 26 and 28 or other means, and the bodies 20 and 22 are moved as a unit rearwardly, with the wheels of the assembly 28 held immobile on the ground surface.

The supports 148 and 150 are in their normal elevated position shown in FIGURE 2 and due to the connection of the latch structures 156 with the adjacent eye elements 158, the supports 148 and 150 are drawn forwardly along the trackway 30 to the dotted line position shown in FIGURE 2, at which point they engage the stop 164 and the spring-biased latch structures 156 release themselves from the eye elements 158. This retains the supports 148 and 150 under the forward end portion of the body 20 while permitting the second wheel axle assembly 28 to move forwardly into the trackway 32 to a position of support of the rearward end portion of the body 22.

It is to be understood that prior to this movement of the bodies 20 and 22 rearwardly, the handle 76 has been pulled to release the pins 66 from the holes 68 and to free the carriage 34 from its attachment to the trackway 30.

When the carriage 34 is within the trackway 32, the pins 66 reengage themselves in the holes 198 provided in the sides of the trackways 32, as in FIGURE 2.

The next step consists in operating the actuating lever 132 to the released position which disengages the moving jaw 136 from the pin 128 and also pulls the pins 142 from the respective holes 146 in the channel member 144.

Before the body 22 is pulled away from the body 20, the mechanisms of the supports 148 and 150 are operated to lower the feet of such supports to the ground-engaging position in supporting relation with respect to the body 20. When this has been done, the body 22 may be pulled away from the body 20 and the platform 184 lowered and the doors 180 and 182 opened to provide access into the interior of the body 22.

Next, the cargo within the body 20 may be removed through the rearward end with the body 20 in situ or an attaching towing vehicle may be connected to the pin 128 in the conventional manner and the body 22 moved forwardly with the brakes applied to the wheels of the axle assembly 26.

Before the body 20 is shifted forwardly over the locked first wheel axle assembly 26 to shift the latter to the position rearwardly of the body 20, a handle 200 on the end of the actuator 114 is pulled so as to release the pins 98 from their respective holes in the side pieces 102 and 104.

The movement of the axle assembly 26 relative to the body 20 is limited by the provision of one or more stops 202 (FIGURE 10) attached to the carriage 88 and engageable with upwardly rising abutments 204 of the same number as the stops 202.

After the axle assembly 26 has been moved rearwardly of the body 20, or rather the body 20 moved over and away from the assembly 26, the top surface of the carriage 88 exteriorly of the body 20 may be employed as a loading platform with the doors 172 and 174 swung outwardly at each end of the platform.

The door 178 may be swung to the position closing the front end of the body 20 and the body 20 towed by a trailing vehicle to another dock or area of loading, as desired.

When it is desired to return the bodies 20 and 22 to the tandem condition, it is only necessary to back the body 22 toward the front end of the body 20 and to cause the tongue structure 118 to enter the open end of the carriage 88, first having shifted the axle assembly 26 to the position under the body 20 so that the forward end of the carriage 88 projects to the position in which it may be engaged by the tongue structure 118.

When the body 22 is backed toward the body 20, the hook mechanism 130 will reengage the pin 128 and the pins 142 will again enter the respective holes provided for them in the channel member 144.

The platform 184, having been previously swung to the vertical position, may be removed entirely and stowed to one side in either the body 20 or 22, as desired, and the respective doors may be returned to their closed position after the bodies are joined and are made ready for transport over a highway when attached to a towing vehicle.

What is claimed is:

1. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first axle assembly, guide means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said trailing or leading bodies at times, and releasable attaching means for securing said trailing and leading bodies together in tandem relation and holding said bodies against lateral movement relative to each other, said releasable means including a single tongue element on the lower center portion of one of said bodies adapted for reception in the guide means on the other of said bodies; said tongue element including a pair of spaced apart noses; said noses terminating adjacent the end of one of said bodies, said releasable means including a hook mechanism between said noses, and located away from the end of said one body, a vertical pin extending downwardly from the lower end portion of the other of said bodies; the spaced apart distance between said noses being progressively narrowed between the end of said one body and said hook means to permit said noses to guide said vertical pin towards said hook means as said bodies are being moved together in abutting end to end relation.

2. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first axle assembly, guide means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said trailing or leading bodies at times, releasable attaching means for securing said trailing and leading bodies together in tandem relation and holding said bodies against lateral movement relative to each other, and means connecting said first axle assembly to said trailing body for movement from the position in which said first axle assembly is beneath and adjacent the rearward end of said trailing body to a position rearwardly of and adjacent the rearward end of said trailing body.

3. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first axle assembly, guide means embodying support means depending from the underface of each of said trailing and leading bodies and hanger means on said second axle assembly and slidably engaging said support means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said trailing or leading bodies at times, and releasable attaching means for securing said trailing and leading bodies together in tandem relation and holding said bodies against lateral movement relative to each other, said releasable means including a single tongue element on the lower center portion of one of said bodies adapted for reception in the guide means on the other of said bodies; said tongue element including a pair of spaced apart noses; said noses terminating adjacent the end of one of said bodies, said releasable means including a hook mechanism between said noses, and located away from the end of said one body, a vertical pin extending downwardly from the lower end portion of the other of said bodies; the spaced apart distance between said noses being progressively narrowed between the end of said one body and said hook means to permit said noses to guide said vertical pin towards said hook means as said bodies are being moved together in abutting end to end relation.

4. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first axle assembly, guide means embodying support means depending from the underface of each of said trailing and leading bodies and hanger means on said second axle assembly and slidably engaging said support means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said trailing or leading bodies at times, and releasable attaching means for securing said trailing and leading bodies together in tandem relation and holding said bodies against lateral movement relative to each other, said releasable means including a single tongue element on the lower center portion of one of said bodies adapted for reception in the guide means on the other of said bodies; said tongue element including a pair of spaced apart noses; said noses terminating adjacent the end of one of said bodies, said releasable means including a hook mechanism between said noses, and located away from the end of said one body, a vertical pin extending downwardly from the lower end portion of the other of said bodies; the spaced apart distance between said noses being progressively narrowed between the end of said one body and said hook means to permit said noses to guide said vertical pin towards said hook means as said bodies are being moved together in abutting end to end relation.

5. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first axle assembly, guide means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said trailing or leading bodies at times, releasable attaching means embodying a box structure dependingly carried by said trailing body adjacent the forward end thereof and having an open end facing forwardly and a tongue structure dependingly carried by the rearward end portion of said leading body slidably received in said box structure for securing said trailing and leading bodies together in tandem relation and holding said bodies against lateral movement relative to each other; said box structure comprising a part of said guide means; and said tongue structure being located on the lower center portion of the rearward end portion of said leading body; said tongue element including a pair of spaced apart noses; said noses terminating adjacent the end of one of said bodies, said releasable means including a hook mechanism between said noses, and located away from the end of said one body, a vertical pin extending downwardly from the lower end portion of the other of said bodies; the spaced apart distance between said noses being progressively narrowed between the end of said one body and said hook means to permit said noses to guide said vertical pin towards said hook means as said bodies are being moved together in abutting end to end relation.

6. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first axle assembly, guide means embodying a first support means depending from the underface of each of said trailing and leading bodies and a first hanger means on said second axle assembly and slidably engaging said support means connecting said second axle assembly to said trailing and leading bodies for movement from the position adjacent said first axle assembly to a position adjacent to and supporting the rearward end portion of said leading body a latching means operatively secured to said second axle assembly for selectively rigidly securing said second axle assembly to one of said trailing or leading bodies at times, releasable attaching means for securing said trailing and leading bodies together in tandem relation and holding said bodies against lateral movement relative to each other, and means embodying a second support means depending from the underface of said trailing body adjacent the rearward end and a second hanger means on said first axle assembly and slidably engaging said second support means connecting said first axle assembly to said trailing body for movement from the position in which said first axle assembly is beneath and adjacent the rearward end of said trailing body to a position rearwardly of and adjacent the rearward end of said trailing body.

7. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first axle assembly, means connecting said second axle assembly to said trailing and leading bodies for movement from the position adjacent said first axle assembly to a position adjacent to and supporting the rearward end portion of said leading body, a latching means operatively secured to said second axle assembly for selectively rigidly securing said second axle assembly to one of said trailing or leading bodies at times, said connecting means embodying an elongated trackway depending from the underface of said trailing body and extending from said first axle assembly to a point inwardly of and spaced from the forward end of said trailing body, another trackway on said leading body extending from the forward end of said first-named trackway to a point beneath and adjacent the rearward end of said leading body, and a carriage carried by said second wheel axle assembly slidable within said first-named and another trackways, and releasable attaching means for securing said trailing and leading bodies together in tandem relation and holding said bodies against lateral movement relative to each other.

8. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first axle assembly, means connecting said second axle assembly to said trailing and leading bodies for movement from the position adjacent said first axle assembly to a position adjacent to and supporting the rearward end portion of said leading body, a latching means operatively secured to said second axle assembly for selectively rigidly securing said second axle assembly to one of said trailing or leading bodies at times, said last-named means embodying an elongated trackway depending from the underface of said trailing body and extending from said first axle assembly to a point inwardly of and spaced from the forward end of said trailing body, another trackway extending from the forward end of said first-named trackway to a point beneath and adjacent the rearward end of said leading body, and a carriage carried by said second wheel axle assembly slidable within said first-named and another trackways, releasable attaching means for securing said trailing and leading bodies together in tandem relation and holding said bodies against lateral movement relative to each other, and means embodying a third trackway depending from the underface of said trailing body and an elongated carriage carried by said first axle assembly slidable in said third trackway connecting said first axle assembly to said trailing body for movement from the position in which said first axle assembly is beneath and adjacent the rearward end of said trailing body to a position rearwardly of and adjacent the rearward end of said trailing body.

9. In a cargo transport assembly, at least two cargo carrying bodies arranged in tandem relation, means on the forward end of the leading body for attachment to a towing vehicle, a first wheel axle assembly positioned transversely on of and beneath the trailing body and adjacent the rearward end of said trailing body for supporting the rearward end portion of said trailing body, a second wheel axle assembly positioned transversely of said trailing body and forwardly of and adjacent said first axle assembly, guide means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said bodies at times, and a releasable attaching means for securing said trailing and leading bodies together in tandem relation and holding said bodies against lateral movement relative to each other; said releasable attaching means being positioned at the lower adjacent end portions of said bodies whereby said bodies are secured together only at their lower adjacent end portions; said releasable attaching means including a tongue element; said tongue element including a pair of spaced apart noses; said noses terminating adjacent the end of one of said bodies, said releasable means including a hook mechanism between said noses, and located away from the end of said one body, a vertical pin extending downwardly from the lower end portion of the other of said bodies; the spaced apart distance between said noses being progressively narrowed between the end of said one body and said hook means to permit said noses to guide said vertical pin towards said hook means as said bodies are being moved together in abutting end to end relation.

10. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body and forwardly of and adjacent said first axle assembly, guide means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said bodies at times, and a releasable attaching means for securing said trailing and leading bodies together in tandem relation and holding said bodies against lateral movement relative to each other; said releasable attaching means including a single tongue element on the lower center portion of one of said bodies adapted for reception in the guide means on the adjacent lower portion of the other of said bodies; said tongue element including a pair of spaced apart noses; said noses terminating adjacent the end of one of said bodies, said releasable means including a hook mechanism between said noses, and located away from the end of said one body, a vertical pin extending downwardly from the lower end portion of the other of said bodies; the spaced apart distance between said noses being progressively narrowed between the end of said one body and said hook means to permit said noses to guide said vertical pin towards said hook means as said bodies are being moved together in abutting end to end relation.

11. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first axle assembly, guide means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said bodies at times, a support means on said guide means, means on said support means for moving said support means forwardly and rearwardly on said guide means at times, and a releasable attaching means for securing said trailing and leading bodies together in tandem relation and holding said bodies against lateral movement relative to each other; said releasable attaching means being positioned at the lower adjacent end portions of said bodies whereby said bodies are secured together only at their lower adjacent end portions.

12. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first axle assembly, guide means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said bodies at times, a support means on said guide means, means on said support means for moving said support means forwardly and rearwardly on said guide means at times, and a releasable attaching means for securing said trailing and leading bodies together in tandem relation and holding said bodies against lateral movement relative to each other.

13. The structure of claim 12 wherein connecting means connect said guide means and said support means to hold said support means in a vertical position with respect to said guide means.

14. The structure of claim 12 wherein said releasable attaching means includes a tongue element on the lower center portion of one of said bodies adapted for reception in the guide means on the other of said bodies; said tongue element including a pair of spaced apart noses; said noses terminating adjacent the end of one of said bodies, said releasable means including a hook mechanism between said noses, and located away from the end of said one body, a vertical pin extending downwardly from the lower end portion of the other of said bodies; the spaced apart distance between said noses being progressively narrowed between the end of said one body and said hook means to permit said noses to guide said vertical pin towards said hook means as said bodies are being moved together in abutting end to end relation.

15. The structure of claim 14 wherein the end portions of said noses adjacent the end of said one body extend downwardly towards the extreme ends thereof so that when said bodies are moved together in end to end abutting relation, and the lower end portion of said other body engages the downwardly extending end portions of said noses, the lower end portion of said other body will move upwardly on the downwardly extending end portions of said noses.

16. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first assembly, guide means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said bodies at times, and a releasable attaching means for securing said trailing and leading bodies together in tandem relation and holding said bodies against lateral movement relative to each other; said releasable attaching means including a tongue element on the lower center portion of one of said bodies adapted for reception in the guide means on the other of said bodies; said tongue element including a pair of spaced apart noses said noses terminating adjacent the end of one of said bodies, said releasable means including a hook mechanism between said noses, and located away from the end of said one body, a vertical pin extending downwardly from the lower end portion of the other of said bodies; the spaced apart distance between said noses being progressively narrowed between the end of said one body and said hook means to permit said noses to guide said vertical pin towards said hook means as said bodies are being moved together in abutting end to end relation.

17. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first axle assembly, guide means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said bodies at times, a tongue element on the lower rearward center end portion of said leading body, said tongue element including a pair of spaced apart noses extending towards the rearward end of said leading body, a releasable hook mechanism secured to said leading body between said noses and adapted to receive and hold a vertically disposed pin therein at times, a vertical pin extending downwardly from the bottom end portion of said trailing body adjacent its forward end, the sides of said noses adjacent the space therebetween having their rearward ends thereof progressively extending away from each other to serve as a guide means for guiding said vertical pin towards said hook mechanism to connect said leading and trailing bodies together when said leading and trailing bodies are moved into end to end abutting relationship.

18. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first axle assembly, guide means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said bodies at times, a tongue element on the lower rearward center end portion of said leading body, said tongue element including a pair of spaced apart noses extending towards the rearward end of said leading body, a releasable hook mechanism secured to said leading body between said noses and adapted to receive and hold a vertically disposed pin therein at times, a vertical pin extending downwardly from the bottom end portion of said trailing body adjacent its forward end, the sides of said noses adjacent the space therebetween having their rearward ends thereof progressively extending away from each other to serve as a guide means for guiding said vertical pin towards said hook mechanism to connect said leading and trailing bodies together when said leading and trailing bodies are moved into end to end abutting relationship; a box structure dependingly carried by said trailing body adjacent the forward end thereof and having an open end facing forwardly towards the tongue element on the rearward end portion of said leading body, said box structure adapted to slidably receive said tongue element to reinforce the connection between said leading and trailing bodies effected by the reception of said vertical pin in said hook mechanism.

19. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forwardly of and adjacent said first axle assembly, guide means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said bodies at times, a tongue element on the lower rearward center end portion of said leading body, said tongue element including a pair of spaced apart noses extending towards the rearward end of said leading body, a releasable hook mechanism secured to said leading body between said noses and adapted to receive and hold a vertically disposed pin therein at times, a vertical pin extending downwardly from the bottom end portion of said trailing body adjacent its forward end, said vertical pin adapted to engage said releasable hook mechanism to connect said leading and trailing bodies together when said leading and trailing bodies are moved into end to end abutting relationship, the rearward end portions of said noses extending downwardly and rearwardly so that when said bodies are moved together in end to end abutting relation, and the bottom of the forward end portion of said trailing body engages the downwardly and rearwardly extending rearward end portions of said noses, the bottom forward end portion of said trailing body will move upwardly on said noses.

20. The structure of claim 19 wherein the sides of said noses adjacent the space therebetween have their rearward ends progressively extending away from each other to serve as a guide means for guiding said vertical pin towards said releasable hook mechanism.

21. In a cargo transport assembly, at least two cargo carrying bodies arranged in tandem relation, means on the forward end of the leading body for attachment to a towing vehicle, a first wheel axle assembly positioned transversely of and beneath the trailing body and adjacent the rearward end of said trailing body for supporting the rearward end portion of said trailing body, a second wheel axle assembly positioned transversely of said trailing body and forward of and adjacent said first axle assembly, guide means connecting said second axle assembly to said trailing and leading bodies for movement along the bottoms of said bodies from the position adjacent said first axle assembly to a position adjacent to and supporting the rearward end portion of said leading body, a latching means operatively secured to said second axle assembly for selectively rigidly securing said second axle assembly to one of said bodies at times, a releasable attaching means for securing said trailing and leading bodies together in tandem relation and holding said bodies against lateral movement relative to each other; said releasable attaching means including a tongue element on the lower center portion of one of said bodies, nose means on said tongue element having an end portion thereof extending towards the other of said bodies; the end portion of said nose means extending downwardly towards the extreme ends thereof so that when said bodies are moved together in end to end abutting relation, and the lower end portion of said other body engages the downwardly extending portion of said nose means, the lower end portion of said other body will move upwardly on the downwardly extending end portion of said nose means.

22. The structure of claim 21 wherein a support means is on said guide means, and means are on said support means for moving said support means forwardly and rearwardly on said guide means at times.

References Cited in the file of this patent

UNITED STATES PATENTS

| | | |
|---|---|---|
| 2,333,853 | Fellabaum | Nov. 9, 1943 |
| 2,369,384 | Zubatsky | Feb. 13, 1945 |
| 2,540,859 | Birkin | Feb. 6, 1951 |
| 2,710,659 | Moederle | June 14, 1955 |
| 2,841,094 | Schumacker | July 1, 1958 |
| 2,925,135 | Hamilton | Feb. 16, 1960 |
| 3,004,772 | Bohlen et al. | Oct. 17, 1961 |

FOREIGN PATENTS

| | | |
|---|---|---|
| 646,318 | Germany | June 11, 1937 |
| 882,806 | Germany | July 13, 1953 |
| 325,336 | Switzerland | Dec. 14, 1957 |